(12) United States Patent
Shibayama

(10) Patent No.: US 6,942,400 B2
(45) Date of Patent: Sep. 13, 2005

(54) IMAGE PICKUP APPARATUS WITH MECHANISM FOR STABLY HOLDING IMAGE PICKUP APPARATUS

(75) Inventor: Yoshinobu Shibayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 231 days.

(21) Appl. No.: 10/174,910

(22) Filed: Jun. 19, 2002

(65) Prior Publication Data

US 2002/0197073 A1 Dec. 26, 2002

(30) Foreign Application Priority Data

Jun. 25, 2001 (JP) ........................................ 2001-191211

(51) Int. Cl.$^7$ .............................................. G03B 17/00
(52) U.S. Cl. ........................ 396/419; 396/423; 396/424; 396/428; 248/228.8; 248/592; 358/906
(58) Field of Search ................................ 396/419, 420, 396/423, 424, 428, 535, 544; 352/243; 248/560, 592, 593, 228.8; 358/906

(56) References Cited

U.S. PATENT DOCUMENTS

| | | | | |
|---|---|---|---|---|
| 3,592,117 A | * | 7/1971 | Fukuda | 396/420 |
| 4,075,642 A | | 2/1978 | Niggeloh | 396/424 |
| 4,405,223 A | * | 9/1983 | Shull | 396/420 |
| 4,819,016 A | * | 4/1989 | Leonard et al. | 396/423 |
| 4,963,987 A | | 10/1990 | Ichiyoshi et al. | 348/375 |
| 4,980,708 A | * | 12/1990 | Leonard | 396/424 |
| 5,036,343 A | * | 7/1991 | Yamanaka | 396/420 |
| 5,343,263 A | * | 8/1994 | Takemae et al. | 396/423 |
| 5,442,453 A | * | 8/1995 | Takagi et al. | 348/333.06 |
| 5,946,512 A | * | 8/1999 | Lavine et al. | 396/423 |
| 6,147,711 A | | 11/2000 | Kawase et al. | 348/376 |
| 6,591,069 B2 | * | 7/2003 | Horiguchi | 396/429 |

FOREIGN PATENT DOCUMENTS

| | | |
|---|---|---|
| JP | 60-218633 | 11/1985 |
| JP | 08-139978 | 5/1996 |
| JP | 11-015072 | 1/1999 |
| JP | 11-275400 | 10/1999 |
| JP | 2002-190974 | 7/2002 |

* cited by examiner

*Primary Examiner*—D. Rutledge
(74) *Attorney, Agent, or Firm*—Cowan, Liebowitz & Latman, P.C.

(57) ABSTRACT

This invention relates to an image pickup apparatus having a stable holding mechanism which can pivot through a predetermined amount to switch between two predetermined positions in using and repositing states, and enables stable phototaking operation. The image pickup apparatus has a grip member which assists the grip of the image pickup apparatus main body for the user and can pivot through a predetermined amount about a pivot support to switch between two predetermined positions in using and repositing states. The pivot support which pivotally supports the grip member is arranged at a corner of the side surface of the image pickup apparatus main body farthest from the phototaking optical system.

13 Claims, 8 Drawing Sheets

FIG. 11 ial video
IMAGE PICKUP APPARATUS WITH MECHANISM FOR STABLY HOLDING IMAGE PICKUP APPARATUS

BACKGROUND OF THE INVENTION

1. Field of the Invention

The present invention relates to an image pickup apparatus having a holding mechanism for stably holding the image pickup apparatus main body when image pickup operation is performed using the image pickup apparatus such as a video camera.

2. Related Background Art

In image pickup operation, a conventional vertical video camera in which a display LCD monitor and power supply battery pack are vertically arranged on one side surface and a storage portion allowing loading/unloading an image pickup recording medium is arranged on the other side surface is stably held by placing four fingers from the forefinger to the little finger on the front surface of the video camera main body and the thumb on the rear surface from the recording medium storage portion side from which a pickup image is recorded, and thereby gripping the video camera main body from the front and back. At this time, a grip belt for assisting the holding of the video camera main body has one end fixed to the front or bottom surface of the camera main body and the other end fixed to an upper portion on the rear surface.

There is proposed a book-shaped (vertical) video camera of a tape cassette laterally-arranging type in which a tape cassette as a pickup image recording medium is extracted from the bottom surface side in order to obtain a low-profile camera main body.

In the conventional tape cassette laterally-arranging type, the bottom surface of the camera main body serves as a tape cassette extraction port, and the grip belt cannot be fixed to the bottom surface of the camera main body. Because of this, one end of the grip belt must be fixed to the front surface of the camera main body, and the other end must be fixed to the rear surface or a portion of the side surface near the rear surface. In this state, the back contact portion of the grip belt cannot reach the back of a hand, and supports the backs of fingers. The camera main body cannot be stably held in phototaking operation. To solve this, a structure in which the back contact portion is pivotal about the camera main body to stable hold the camera main body in phototaking operation has been proposed. As an example of the conventionally proposed pivotal back contact portion, the two ends of the grip belt are fixed to a camera main body gripped by the palm of the hand, and the entire housing is pivoted. In this case in order to stably hold the camera main body, the camera main body must be small enough to be easily gripped by the palm of the hand. When the camera main body incorporates a display LCD or battery, the interior of the pivot shaft of the housing must be electrically wired. This results in a complicated structure and a bulky camera main body. As another example, one end of the grip belt is completely fixed, and the other end is fixed to the camera main body via a part called a hand strap support which pivots and stands, thereby compensating for the storage of a grip portion for gripping the camera main body.

In this structure, when the hand strap support is attached to or near the front surface of the camera main body, the standing height of the hand strap support must be set very large in order to cover the back of the hand with the back contact portion of the grip belt. Since the standing portion of the hand strap support must be directly gripped at this time, forming the hand strap support into an easy-to-grip shape leads to a large-size hand strap support. Also, other problems such as a complicated structure are posed because the grip belt must be firmly fixed to the camera main body while the hand strap support stands. In the prior art, the two ends of the grip belt are fixed to the camera main body. When the cassette cover is to be opened, the cassette cover hits the grip belt and is difficult to open.

Since a pivot support member which pivotally supports the grip belt is arranged on the front side of the side surface of the camera apparatus main body near a phototaking optical system, the finger of the user readily interferes with the phototaking lens, degrading photography.

SUMMARY OF THE INVENTION

The present invention has been made in consideration of the above situation, and its object is to provide an image pickup apparatus having a stable holding mechanism which can pivot through a predetermined amount to switch between two predetermined positions in use and repositing states, and enables stable phototaking operation.

To achieve at least one of the above-described objects, according to an aspect of the present invention, a vertical rectangular parallelepiped image pickup apparatus of the present invention comprises:

a grip member which assists grip of an image pickup apparatus main body for a user and pivots with respect to the image pickup apparatus main body in order to move between using and repositing states, the grip member pivoting about an end of the grip member; and a pivot support unit which pivotally supports the grip member at a corner of a side surface of the image pickup apparatus main body farthest from a phototaking optical system, wherein a longitudinal direction of the grip member coincides with a widthwise direction of the side surface of the image pickup apparatus main body in the repositing state, and the grip member pivots clockwise to come to be in the using state.

The above and other objects, features, and advantages of the present invention will be apparent from the following detailed description of the preferred embodiments in conjunction with the accompanying drawings.

DETAILED DESCRIPTION OF THE PREFERRED EMBODIMENTS

An image pickup apparatus having a stable holding mechanism according to an embodiment of the present invention will be described below.

Figure 1:
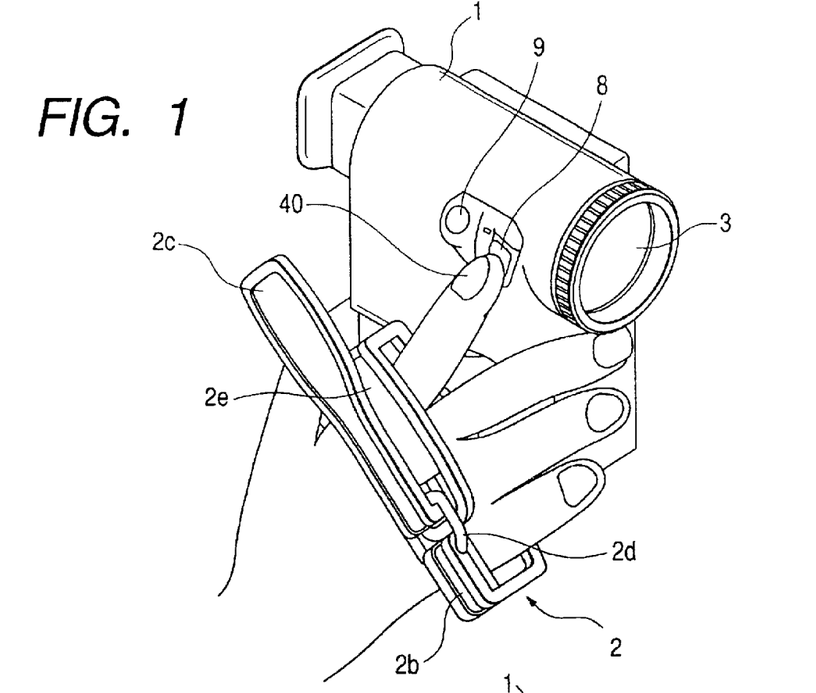
FIG. 1 is a perspective view showing the using state of a video camera serving as an example of an image pickup apparatus having a stable holding mechanism according to an embodiment of the present invention when diagonally viewed downward from the front.
Figure 2:
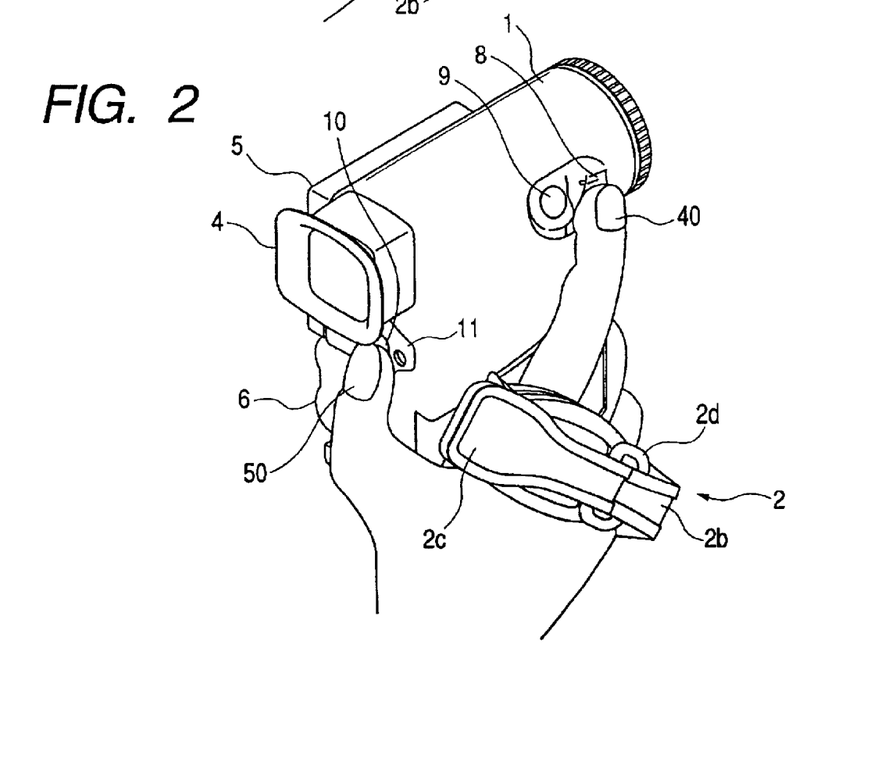
FIG. 2 is a perspective view showing the using state (trigger button operation state as phototaking start/end operation) of the video camera according to the embodiment of the present invention when diagonally viewed downward from the rear.
Figure 3:
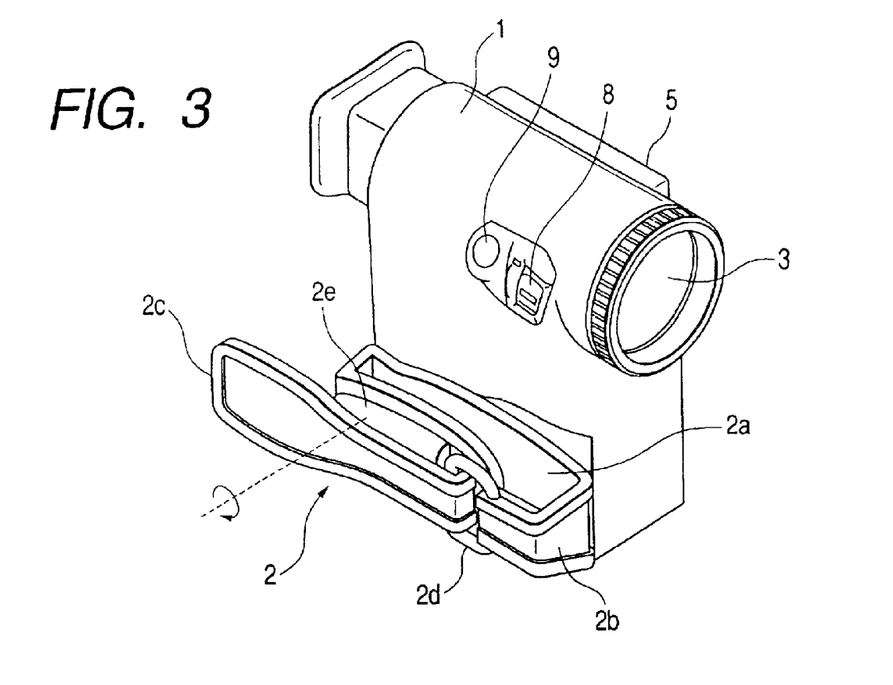
FIG. 3 is a perspective view showing the repositing state of the grip belt of the video camera according to the embodiment of the present invention when diagonally viewed downward from the front.
Figure 4:
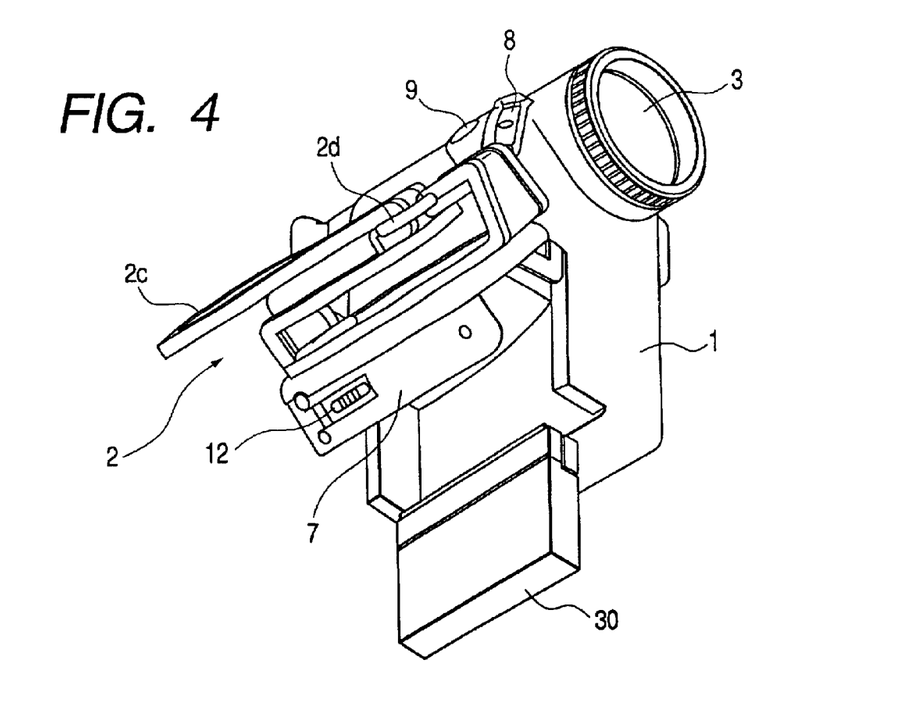
FIG. 4 is a perspective view showing a state in which the cassette cover of the video camera of the embodiment of the present invention is open when diagonally viewed upward from the front.
Figure 5:
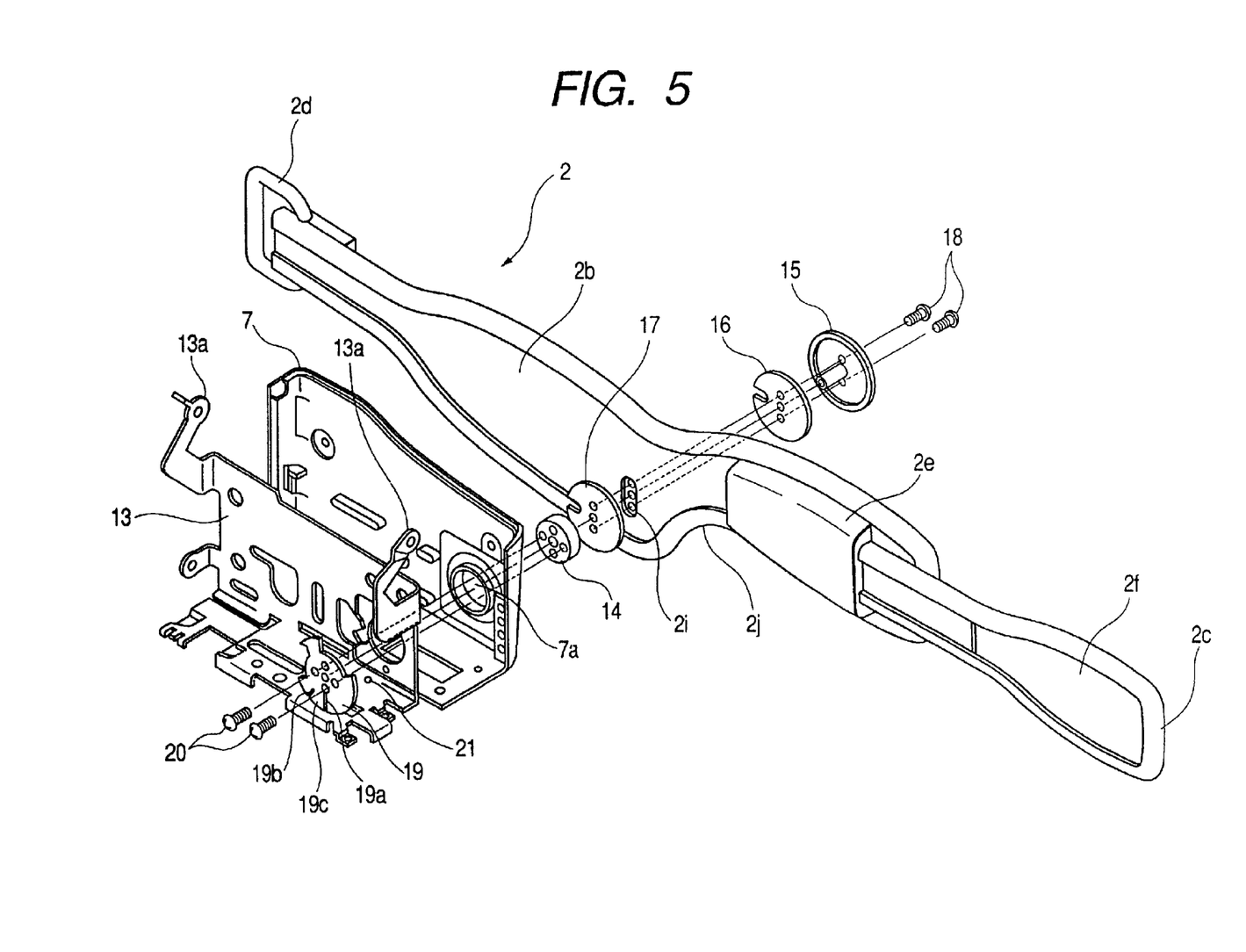
FIG. 5 is an exploded perspective view showing a structure in which the grip belt is pivotally supported and fixed to the cassette cover when viewed from the inside.
Figure 6:
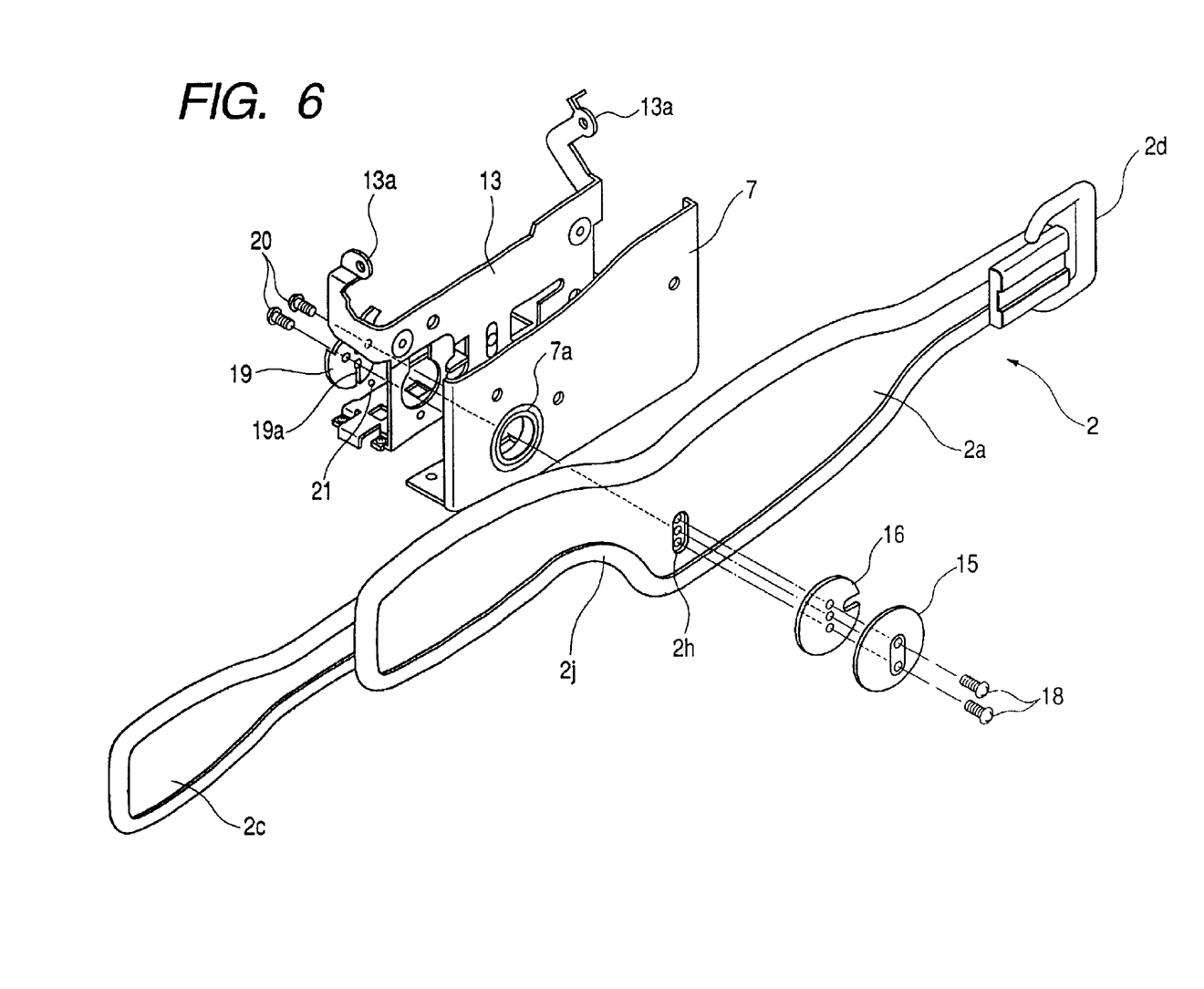
FIG. 6 is an exploded perspective view showing the structure in which the grip belt is pivotally supported and fixed to the cassette cover when viewed from the outside.
Figure 7:
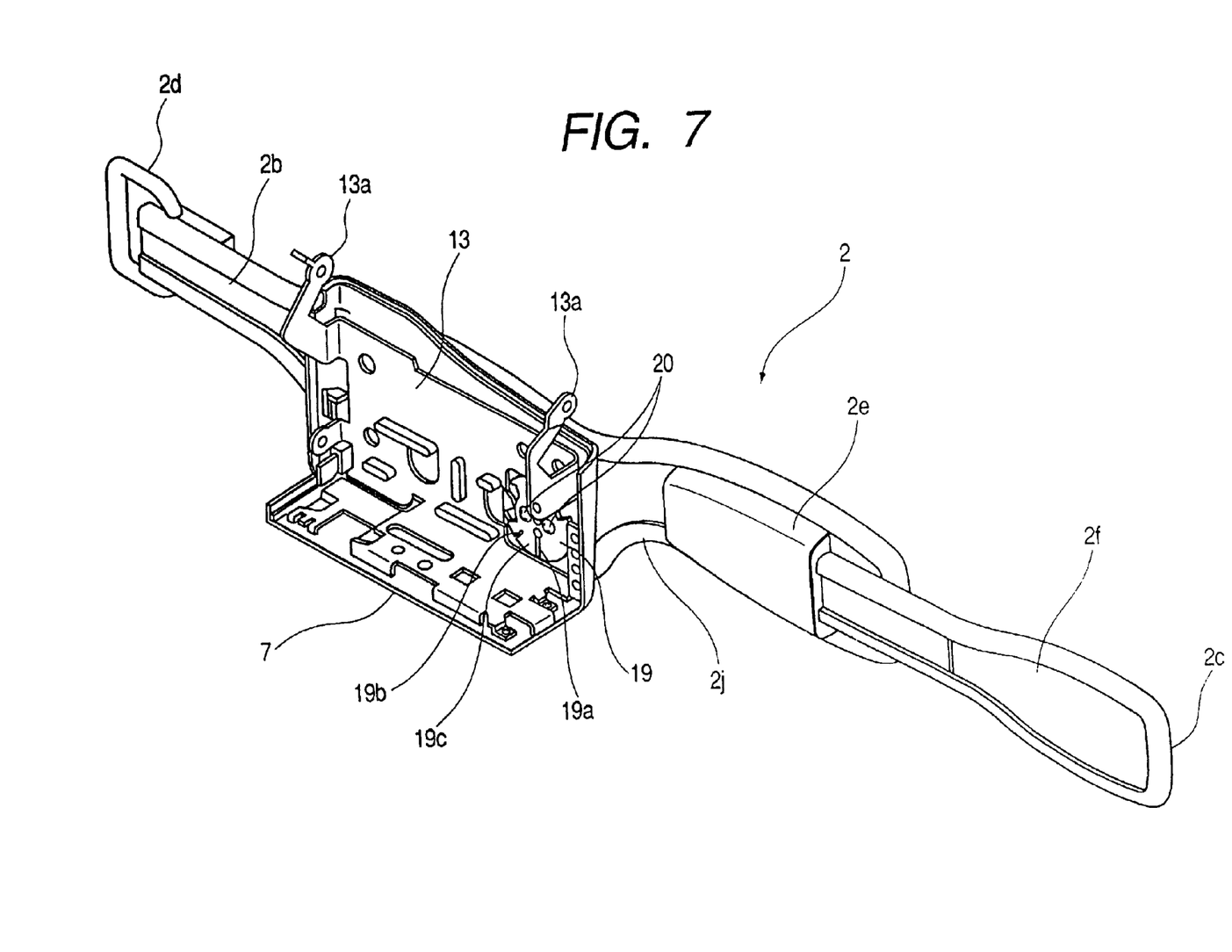
FIG. 7 is a perspective view showing a state in which building components in FIG. 5 are assembled when viewed from the inside.
Figure 8:
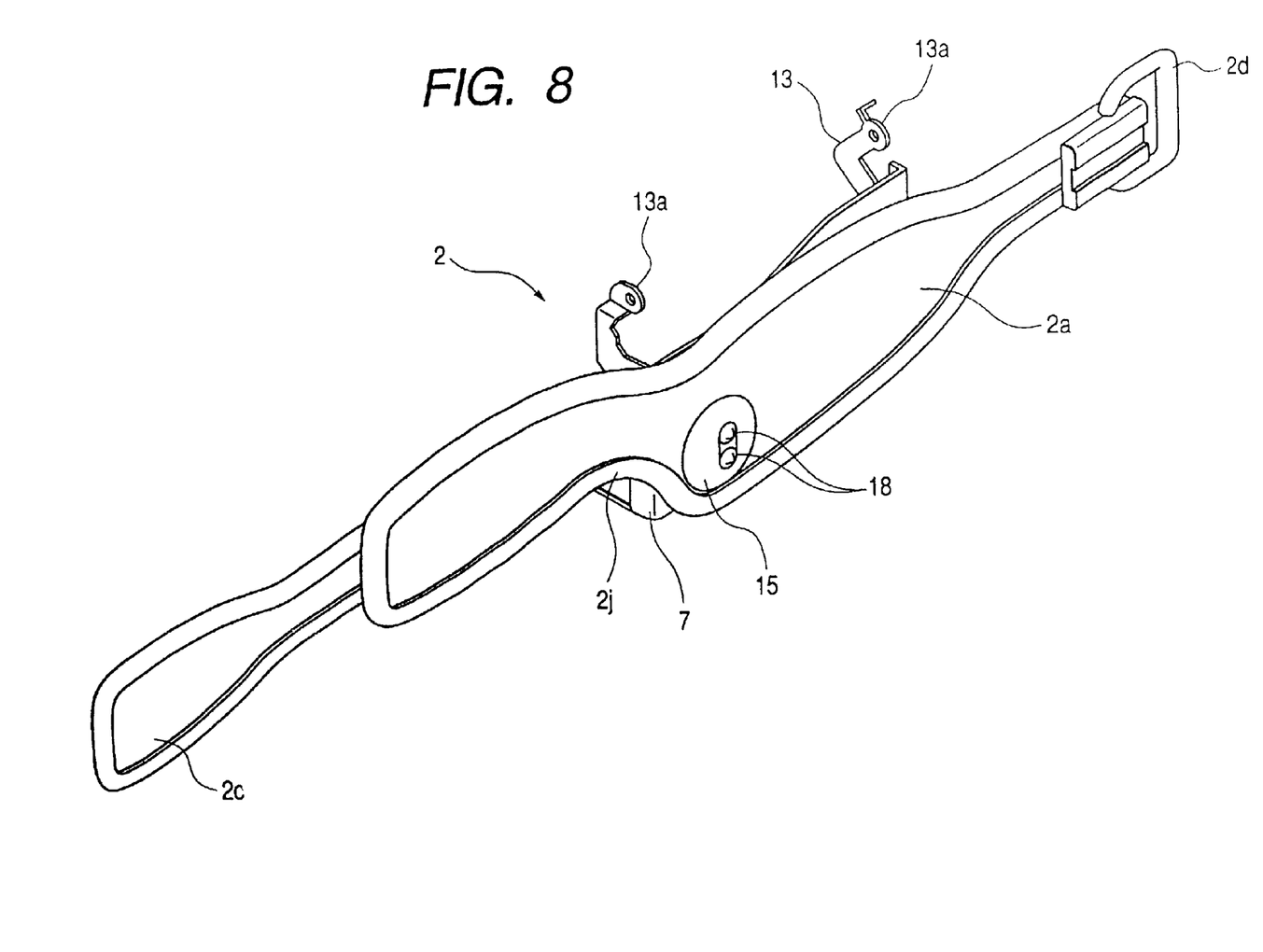
FIG. 8 is a perspective view showing the state in which the building components in FIG. 5 are assembled when viewed from the outside.
Figure 9A:
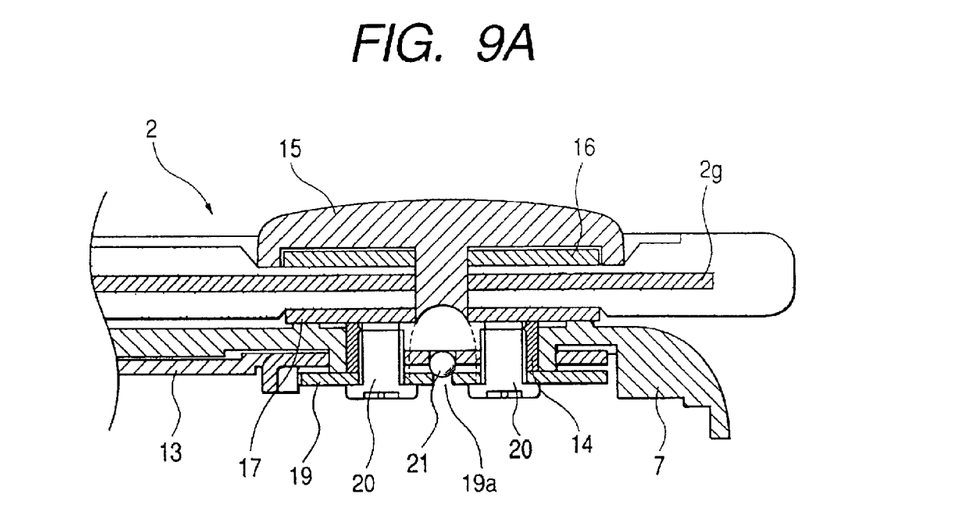
FIGS. 9A and 9B are sectional views showing the pivot shaft of the grip belt.
Figure 9B:
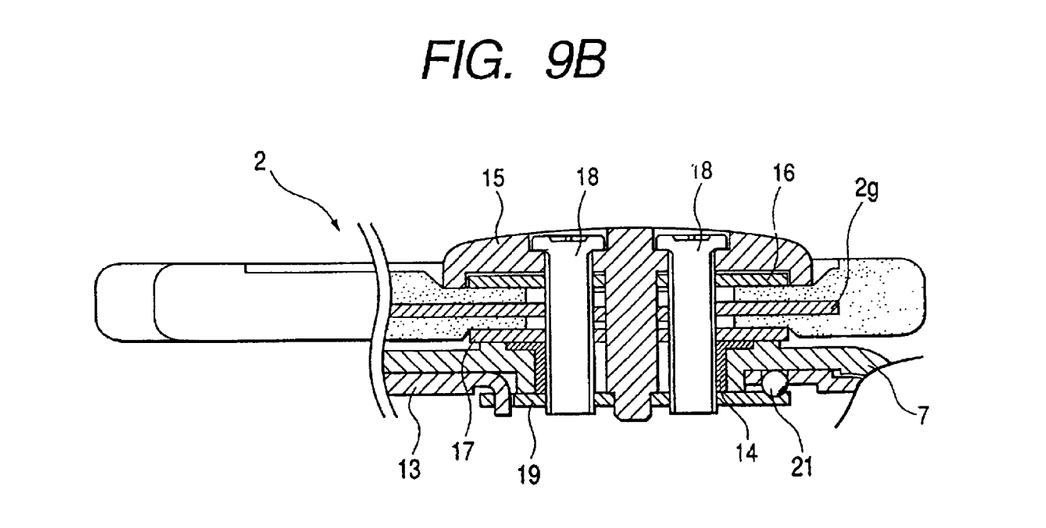
Figure 10:
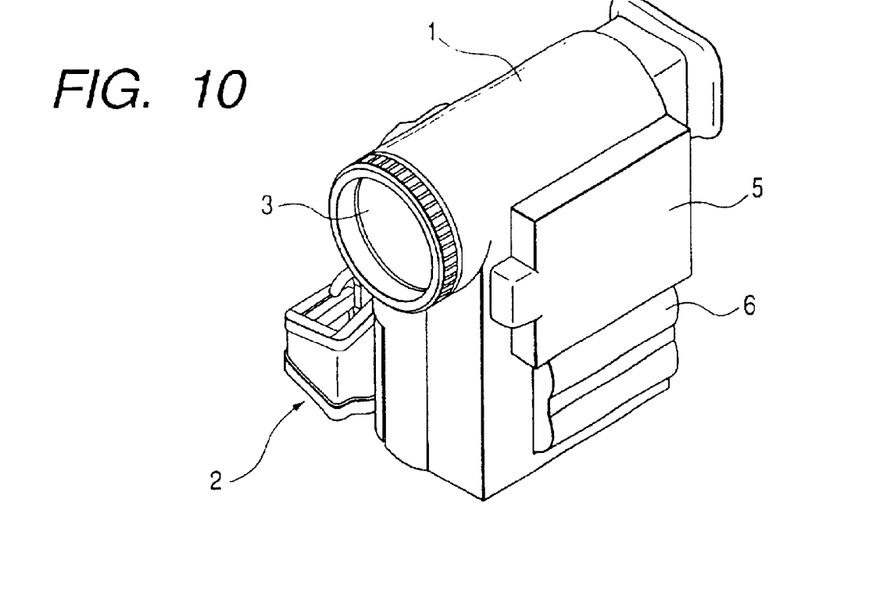
FIG. 10 is a perspective view showing a side surface opposite to the grip belt attaching surface in the non-using state (repositing) of the grip belt of the video camera of the present invention when diagonally viewed downward from the front.
Figure 11:
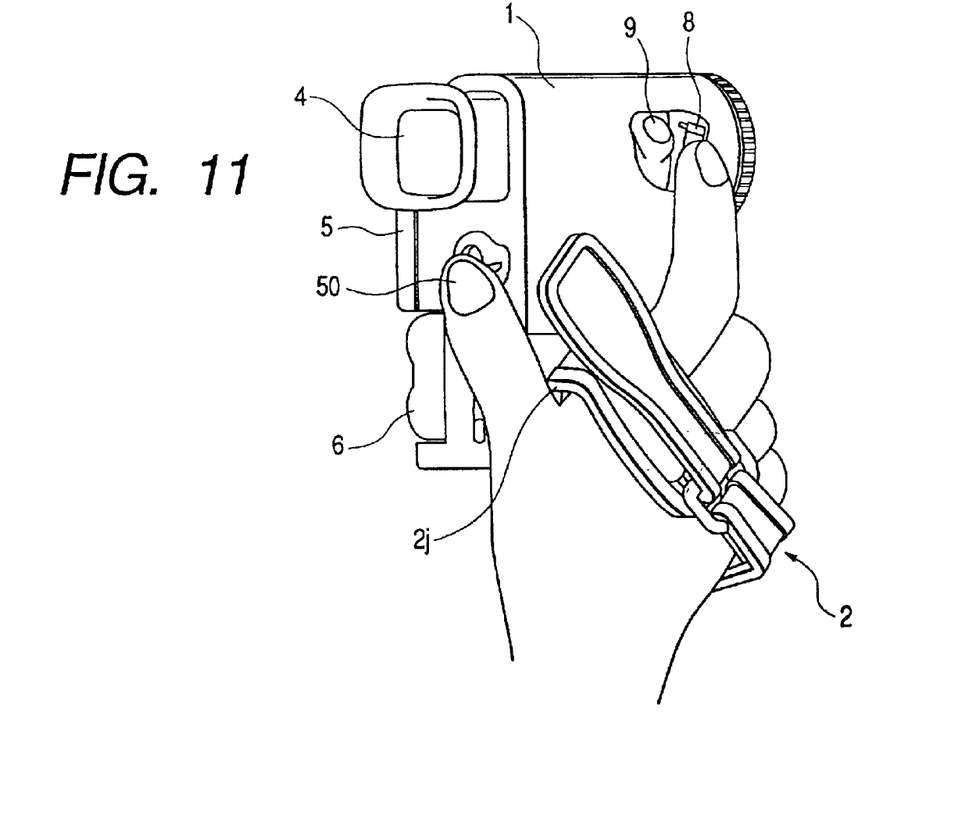
FIG. 11 is a perspective view showing the grip belt attaching surface in the using state of the grip belt of the video camera of the present invention when diagonally viewed upward from the rear.

FIG. 1 is a perspective view showing the using state of a video camera serving as an example of the image pickup apparatus having the stable holding mechanism according to the embodiment when diagonally viewed downward from the front. FIG. 2 is a perspective view showing the using state (trigger button operation state as phototaking start/end operation) of the video camera of the embodiment when diagonally viewed downward from the rear. FIG. 3 is a perspective view showing the repositing state of the grip belt of the video camera of the embodiment when diagonally viewed downward from the front. FIG. 4 is a perspective view showing a state in which the cassette cover of the video camera of the embodiment is open when diagonally viewed upward from the front. FIG. 5 is an exploded perspective view showing a structure in which the grip belt is pivotally supported and fixed to the cassette cover when viewed from the inside. FIG. 6 is an exploded perspective view showing the structure in which the grip belt is pivotally supported and fixed to the cassette cover when viewed from the outside. FIG. 7 is a perspective view showing a state in which building components in FIG. 5 are assembled when viewed from the inside. FIG. 8 is a perspective view showing the state in which the building components in FIG. 5 are assembled when viewed from the outside. FIGS. 9A and 9B are sectional views showing the pivot shaft of the grip belt. FIG. 10 is a perspective view showing a side surface opposite to the grip belt attaching surface in the non-using state (repositing state) of the grip belt of the video camera of the present embodiment when diagonally viewed downward from the front. FIG. 11 is a perspective view showing the grip belt attaching surface in the using state of the grip belt of the video camera of the present embodiment when diagonally viewed upward from the rear.

This embodiment will be explained below with reference to the accompanying drawings.

A video camera main body 1 has a grip belt 2 constituted as follows. An inner belt surface 2a which directly contacts the palm and back of a hand is made of a soft material. An outer belt surface 2b which does not directly contact the palm and back of the hand is made of a synthetic leather to ensure good appearance and the tensile strength of the grip belt itself in the plane direction. A distal end 2c is inserted into a ring 2d from the inner belt surface 2a side and folded back. Then, the surface of a proximal end coupling portion 2e sewed on the proximal end of the distal end 2c and the surface of a distal end coupling portion 2f on the inner surface of the distal end 2c come into contact with each other to form a loop. As shown in FIGS. 1 and 2, the user inserts his/her hand into this loop to hold the video camera main body 1. The proximal end coupling portion 2e and distal end coupling portion 2f are formed from freely detachable engaging members such as Velcro®. Even if users change and thus the size of the hand changes, the distal end 2c is pulled to change and adjust the loop of the grip belt 2, and the proximal end coupling portion 2e and distal end coupling portion 2f can be brought into contact with each other. A metal reinforcing plate 2g is sandwiched between the inner belt surface 2a of the grip belt 2 that contacts the palm of the hand and the outer belt surface 2b that does not contact the palm of the hand. When the user holds the video camera main body 1, the rigidity of the metal reinforcing plate 2g integrates the video camera main body 1 and grip belt 2.

The video camera of the present embodiment comprises a phototaking lens 3 serving as a phototaking optical system, an eyepiece lens 4, an LCD 5 which displays an image, a battery 6, a cassette cover 7 which can be opened/closed to load/unload a tape cassette 30, a zooming knob 8 which is attached to the same side surface as the grip belt 2, is arranged at an upper front portion where the zooming knob 8 can be easily operated with a forefinger when the video camera main body 1 is gripped, and is used to switch the phototaking magnification of an object, a still image trigger button 9 which is arranged adjacent to the zooming knob 8 and operated with a forefinger 40 to take a still image, a moving image trigger button 10 which is arranged on the rear surface of the video camera main body 1 and operated with a thumb 50 to take a moving image when the video camera main body 1 is gripped, a mode switching dial 11 which pivots-about the moving image trigger button 10, switches between the power OFF mode, recording mode, and playback mode of the video camera, and is operated with the thumb 50 similarly to the moving image trigger button 10, an opening knob 12 for opening the cassette cover 7, and a cassette arm 13 which is pivotally coupled about a pair of pivotal hinges 13a and fixes the cassette cover. The video camera further comprises a pivot shaft 14 which pivots and is fitted in a pivot hole 7a of the cassette cover 7. The pivot shaft 14 has four threaded holes. Of these holes, two, upper and lower holes allow fixing a building component made up of a pivot cover 15, an inner belt surface reinforcing plate 16, the grip belt 2, and an outer belt surface reinforcing plate 17 sequentially from the outside with two outer fixing screws 18, thus forming a belt unit. The grip belt 2 is sandwiched between the inner and outer belt surface reinforcing plates 16 and 17. The plates 16 and 17 prevent the stretch of the cloth of the grip belt 2 or the spread of the fray of fibers at openings 2h and 2i formed in the two surfaces of the grip belt 2 when the grip belt 2 is pulled in a stripping direction from the video camera main body 1.

The grip belt unit is clamped and fixed to the pivot shaft 14 together with a click plate 19 by two inner fixing screws 20 from the inside-of the cassette cover 7. The pivot shaft 14 is arranged at the corner of a side surface farthest from the phototaking lens 3 of the video camera main body 1. This arrangement prevents a user's finger from interfering with the phototaking lens 3 when the user grips the video camera main body 1. The click plate 19 has two slits 19a and 19b so as to generate a holding force when the grip belt 2 changes from a using state or repositing state. In assembly, a steel ball 21 is interposed between the cassette cover 7 and the slit 19a of the click plate 19, and is fixed with the inner fixing screws 20. The apex of the steel ball 21 is fitted in the slit 19a, and the grip belt 2 is held in the repositing state. At this time, the longitudinal direction of the grip belt 2 coincides with the widthwise direction of the side surface of the video camera main body 1, and the grip belt 2 is contained in the lower portion of the side surface of the video camera main body 1. The holding force at this time is set not to move the grip belt 2 by its own weight. To switch the grip belt 2 from the repositing state to the using state, the grip belt 2 is pivoted counterclockwise, as shown in FIG. 3. Then, the slit 19a of the click plate 19 is removed from the steel ball 21 to generate a click. An arm 19c between the slits 19a and 19b is elastically deformed by the steel ball 21 to generate a pivot friction force. The grip belt 2 pivots to a predetermined position in the using state, and the steel ball 21 is fitted in the slit 19b of the click plate 19 to hold the grip belt 2 in the using state. The grip belt 2 can switch from the repositing state to the using state only by rotating it counterclockwise an angle of 45°, and thus stable phototaking operation can quickly start. The pivoting distal end of the grip belt 2 projects from the bottom surface of the video camera main body 1. Considering this, the holding force at this time is set to such a friction force so as to pivot the grip belt 2 to a predetermined position in the repositing state by the weight of the video camera main body 1 when the video camera main body 1 is placed on the floor or the like.

As shown in FIG. 4, the cassette cover 7 is released from an opening inhibition lock and is opened by operating the opening knob 12. The cassette cover 7 allows loading/unloading the tape cassette 30. The grip belt 2 is fixed to the cassette cover 7 itself so as to pivot and open the cassette cover 7, and does not interfere with opening of the cassette cover 7 and subsequent loading/unloading of the tape cassette 30.

To hold the video camera main body 1, the user of the video camera inserts his/her hand into a loop formed by bringing the surfaces of the distal and proximal end coupling portions 2f and 2e of the grip belt 2 into contact with each other via freely detachable engaging members such as Velcro® described above. The user pulls the distal end 2c of the grip belt 2 to change and adjust the loop size so as to fit the grip belt 2 on his/her hand. Then, the thumb 50 and forefinger 40 naturally reach the moving image trigger button 10 and zooming knob 8, respectively. The pivot cover 15 of the inner belt surface 2a in contact with the palm of the hand projects from the inner surface of the grip belt 2, but is positioned in and fitted into a space naturally formed by the palm of the hand when the user holds the video camera main body 1. When the user grips the video camera main body 1, the pivot cover 15 touches the palm without any uncomfortable feeling. The pivot cover 15 functions as the center of pivot of the grip belt 2, and is arranged at a back portion on a side surface of the video camera main body 1 on the grip belt 2 side. When the user grips the front and back of the video camera main body 1 in the using state in which the grip belt 2 pivots, the back of the gripping hand is fully covered with the back contact portion of the grip belt 2, as shown in FIGS. 1 and 2.

When a user with a big hand grips the video camera main body 1, his/her little finger may protrude from the lower portion of the front surface of the video camera main body 1, so that the video camera main body 1 may be held unstably. Even in this case, the little finger reaches the video camera main body to maintain the stability of gripping the video camera main body 1 because of the following reason. That is, the center of pivot of the grip belt 2 is set at the back portion of the video camera main body 1, and the displacement amount of the grip belt 2 can be kept large with a small pivot angle on the front side of the video camera main body 1. While the pivoting distal end of the grip belt 2 coincides with the extending portion of the video camera main body 1 below the front surface, a finger support can ensure a sufficient size.

As shown in FIG. 11, a side surface 2j of the looped grip belt 2 that contacts with a portion between the palm and back of the hand, i.e., the base of the thumb on the back side of the video camera main body 1, is curved in accordance with the base shape of the thumb so as not to inhibit the operation of the moving image trigger button 10 with the thumb. The side surface 2j is fitted on the entire hand of the user without any uncomfortable feeling.

As has been described above, the pivotal grip belt according to the present embodiment of the present invention provides the following effects.

(1) The center of pivot of the grip belt which can pivot to using and repositing positions is set on the back side of the grip belt attaching surface positioned at the lower portion of the video camera main body. The pivotal distal end is displaced on the front side of the camera. Even when the user grips the front and back of the camera with one hand, the back contact portion of the grip belt can move with a small pivot angle to a position where the back contact portion can cover the back of the hand. The user can then stably hold the camera.

(2) The grip belt is constituted by one member from the palm to back of the hand, and keeps the same shape in both the using and repositing states. A portion of the grip belt that directly contacts the hand is made of a soft member from the palm to back of the hand, and a hard member is inserted in the soft member. When the user grips the camera, he/she feels good at the portion which directly contacts the hand in a simple structure. Even if the little finger cannot sufficiently reach the lower portion of the camera on the front side of the camera, the hard member functions as a finger support. Even a user with a larger or smaller hand can stably hold the camera.

(3) The grip member is held by predetermined holding forces at predetermined positions in the using and repositing states. In the using state, the grip member is held by a holding force which allows the grip member to pivot by the weight of the camera main body. In the repositing state, the grip member is held by a holding force which inhibits the grip member from pivoting by the weight of the grip member. This prevents the grip belt from improperly moving to the position of the using state. Even if the user carelessly puts the camera main body on a table or the like in the using state, the grip belt pivots about the pivot shaft to the repositing position. The user need not pay particular attention to the handling of the camera. The camera hardly receives a force which damages the pivot shaft or holding portion of the grip belt, and is rarely broken.

(4) A portion of the grip belt that abuts against the proximity of the base of the thumb in the using state is so curved as not to fix the base of the thumb. This shape realizes a finger layout which facilitates an operation on the back surface of the camera main body.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body; and
   a pivot support member which pivotally supports the grip member along a side surface of the image pickup apparatus main body,
   wherein the grip member is supported by the pivot support member at one place, and
   wherein the pivot support member is arranged on a side surface of the image pickup apparatus main body, opposite to the display unit.

2. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body;
   a pivot support member which pivotally supports the grip member along a side surface of the image pickup apparatus main body; and
   a cover of a holding portion which is arranged in the side surface of the image pickup apparatus main body to allow loading/unloading a recording medium which records an image into/from the holding portion,
   wherein the grip member is supported by the pivot support member at one place, and
   wherein the pivot support member is attached to the cover.

3. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body; and
   a pivot support member which pivotally supports the grip member along a side surface of the image pickup apparatus main body,
   wherein the grip member is supported by the pivot support member at one place, and a portion of said grip member that contacts a hand of a user who grips the image pickup apparatus main body is formed from a soft material.

4. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body; and
   a pivot support member which pivotally supports the grip member along a side surface of the image pickup apparatus main body,
   wherein the grip member is supported by the pivot support member at one place and is formed from the soft material which incorporates a hard material.

5. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body; and
   a pivot support member which pivotally supports the grip member along a side surface of the image pickup apparatus main body,
   wherein the grip member is supported by the pivot support member at one place, and wherein the pivot support member includes a click mechanism to hold the grip member at two predetermined positions.

6. An image pickup apparatus comprising:
   a grip member with which a user holds the image pickup apparatus;
   a display unit with which an image pickup apparatus main body is equipped;
   an image pickup optical member with which the image pickup apparatus main body is equipped;
   a viewfinder which is fixed to the image pickup apparatus main body; and
   a pivot support member which pivotally supports the grip member along a side surface of the image pickup apparatus main body,
   wherein the grip member is supported by the pivot support member at one place, and wherein the image pickup optical member is arranged at an upper forward portion of the image pickup apparatus main body, and the pivot support member is arranged at a lower rear portion of the image pickup apparatus main body.

7. An apparatus according to claim 6, further comprising:
   a first operation portion which is arranged on the same side surface of the image pickup apparatus main body as the pivot support member and changes a magnification ratio; and
   a second operation portion which is arranged on a rear surface on the image pickup apparatus main body and starts photographing and recording.

8. An image pickup apparatus comprising:
   an image pickup apparatus main body arranged to include a photographing lens portion arranged on a first surface thereof;
   a display portion arranged on a second surface of said image pickup apparatus main body to display an image;
   a holding portion arranged on a third surface of said image pickup apparatus main body, opposite to the second surface, to detachably hold a recording medium, wherein the second surface is arranged on one side of the first surface and the third surface is arranged on the other side of the first surface;

a cover arranged to cover said holding portion;

a holding member arranged on said cover to be used by a user of said image pickup apparatus to hold said image pickup apparatus main body; and a member arranged to cause said holding member to be rotatable with respect to a predetermined axis, wherein said holding member includes a belt to support the back of the user's hand and is arranged so that the user's hand is insertable between the back of the belt and the third surface.

9. An apparatus according to claim 8, further comprising an operation member arranged on a fourth surface opposite to the first surface to start recording of moving image.

10. An apparatus according to claim 9, further comprising an operation member arranged on the third surface to start recording of a still image.

11. An apparatus according to claim 8, further comprising an operation member arranged on the third surface to start recording of a still image.

12. An apparatus according to claim 8, wherein said holding member is arranged to move in accordance with opening and closing said cover.

13. An apparatus according to claim 8, wherein said image pickup apparatus main body is arranged so that the length thereof in the vertical direction is longer than that in the lateral direction.

* * * * *